United States Patent
Sng et al.

(10) Patent No.: US 8,825,748 B2
(45) Date of Patent: Sep. 2, 2014

(54) SANDBOXED DAEMON PROCESS INVOCATION THROUGH HTTP

(75) Inventors: Swee Huat Sng, Torrance, CA (US); Joseph Yang, Cypress, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 468 days.

(21) Appl. No.: 13/176,927

(22) Filed: Jul. 6, 2011

(65) Prior Publication Data

US 2013/0013665 A1 Jan. 10, 2013

(51) Int. Cl.
*G06F 15/16* (2006.01)
*G06F 9/48* (2006.01)
*G06F 9/54* (2006.01)
*G06F 21/53* (2013.01)
*G06F 11/00* (2006.01)

(52) U.S. Cl.
CPC .......... *G06F 21/53* (2013.01); *G06F 2209/541* (2013.01); *G06F 9/4843* (2013.01); *G06F 9/545* (2013.01)
USPC ........... 709/203; 709/202; 709/219; 709/225; 709/227; 726/26; 726/2

(58) Field of Classification Search
CPC ... G06F 21/53; G06F 21/545; G06F 21/4843; H04L 63/20
USPC ......... 709/203, 202, 219, 225, 227; 726/26, 2
See application file for complete search history.

(56) References Cited

U.S. PATENT DOCUMENTS

| | | | | |
|---|---|---|---|---|
| 6,038,296 | A * | 3/2000 | Brunson et al. | 379/100.11 |
| 6,298,445 | B1 * | 10/2001 | Shostack et al. | 726/25 |
| 6,457,063 | B1 * | 9/2002 | Chintalapati et al. | 719/317 |
| 6,651,108 | B2 * | 11/2003 | Popp et al. | 719/315 |
| 6,654,785 | B1 * | 11/2003 | Craig | 709/203 |
| 6,711,618 | B1 * | 3/2004 | Danner et al. | 709/228 |
| 6,766,351 | B1 * | 7/2004 | Datla | 709/203 |
| 6,948,183 | B1 * | 9/2005 | Peterka | 725/25 |
| 7,685,638 | B1 * | 3/2010 | Buches | 726/22 |
| 7,761,863 | B2 * | 7/2010 | Illowsky et al. | 717/167 |
| 2003/0014521 | A1* | 1/2003 | Elson et al. | 709/225 |
| 2003/0144894 | A1* | 7/2003 | Robertson et al. | 705/8 |
| 2004/0031052 | A1* | 2/2004 | Wannamaker et al. | 725/61 |
| 2004/0153493 | A1 | 8/2004 | Slavin et al. | |
| 2005/0021953 | A1* | 1/2005 | Trommler | 713/166 |

(Continued)

FOREIGN PATENT DOCUMENTS

| | | |
|---|---|---|
| EP | 1130510 A2 | 9/2001 |
| JP | 2008-211747 | 9/2008 |
| JP | 2009-253853 | 10/2009 |
| JP | 2010-247520 | 11/2010 |

*Primary Examiner* — Alina N Boutah

(74) *Attorney, Agent, or Firm* — Brooks Acordia IP Law, P.C.; Pejman Yedidsion; David Ripma

(57) ABSTRACT

Methods and devices for initiating, by a client, a set of one or more applications, wherein each initiated application is associated with an Uniform Resource Locator (URL), and wherein the initiating is based on a Hypertext Transfer Protocol (HTTP) request to a computer host having a server. The methods and devices further executing an application from the set of one or more applications, based on a rule set, in a processing environment limiting the functionality of the initiated application, and wherein the application is executed in the background of an operating system of the server based on the rule set.

16 Claims, 6 Drawing Sheets

(56) References Cited

U.S. PATENT DOCUMENTS

| | | | |
|---|---|---|---|
| 2006/0213975 A1* | 9/2006 | Krishnan et al. | 235/380 |
| 2006/0253785 A1* | 11/2006 | Dowling | 715/738 |
| 2006/0277307 A1* | 12/2006 | Bernardin et al. | 709/226 |
| 2007/0282951 A1* | 12/2007 | Selimis et al. | 709/205 |
| 2008/0127292 A1* | 5/2008 | Cooper et al. | 726/1 |
| 2008/0167732 A1 | 7/2008 | Slavin et al. | |
| 2008/0189423 A1* | 8/2008 | Takahashi et al. | 709/227 |
| 2008/0215677 A1* | 9/2008 | Osias | 709/203 |
| 2009/0234913 A1* | 9/2009 | Lee | 709/203 |
| 2010/0064299 A1* | 3/2010 | Kacin et al. | 719/317 |
| 2011/0145926 A1* | 6/2011 | Dalcher et al. | 726/26 |
| 2011/0167493 A1* | 7/2011 | Song et al. | 726/23 |
| 2011/0179483 A1* | 7/2011 | Paterson et al. | 726/22 |
| 2011/0185433 A1* | 7/2011 | Amarasinghe et al. | 726/25 |
| 2011/0246618 A1* | 10/2011 | Howard et al. | 709/219 |
| 2011/0289556 A1* | 11/2011 | Pieczul et al. | 726/3 |
| 2011/0296515 A1* | 12/2011 | Krstic et al. | 726/10 |
| 2012/0022943 A1* | 1/2012 | Howard et al. | 705/14.51 |
| 2012/0041752 A1* | 2/2012 | Wang et al. | 704/2 |
| 2012/0185863 A1* | 7/2012 | Krstic et al. | 718/104 |
| 2012/0207290 A1* | 8/2012 | Moyers et al. | 379/90.01 |
| 2012/0221955 A1* | 8/2012 | Raleigh et al. | 715/736 |
| 2012/0284715 A1* | 11/2012 | Fitzgerald et al. | 718/1 |
| 2013/0036448 A1* | 2/2013 | Aciicmez et al. | 726/1 |
| 2013/0055341 A1* | 2/2013 | Cooper et al. | 726/1 |

* cited by examiner

SANDBOXED DAEMON PROCESS INVOCATION THROUGH HTTP

BACKGROUND

Daemon processes are applications that run in the background of a computer operating system and are usually spawned by the operating system during initialization. A daemon process may run inside a sandbox, i.e., a processing environment limiting the functionality of the daemon process.

SUMMARY

Embodiments include methods, systems, and devices where, for example a method embodiment may include the steps of: (a) initiating, by a client, a set of one or more applications, wherein each initiated application may be associated with an Uniform Resource Locator (URL), and wherein the initiating may be based on a Hypertext Transfer Protocol (HTTP) request to a computer host having a server, and (b) executing an application from the set of one or more applications, based on a rule set, in a processing environment limiting the functionality of the initiated application, and where the application may be executed in the background of an operating system of the server based on the rule set. Optionally the client may be external to the server. The server may also be disposed outside a network firewall.

In some embodiments the server may be a multifunction peripheral (MFP) device. Optionally the client may also be a multifunction peripheral (MFP) device. The MFP device may comprise a web application hosting platform.

Other embodiments include methods, systems, and devices where, for example a method embodiment may include the steps of: (a) invoking, by a server of a computer host, via a Hypertext Transfer Protocol (HTTP) request from a client, a set of one or more applications, where each invoked application may be associated with an Uniform Resource Locator (URL), and (b) executing, by the server, an application from the set of one or more applications, based on a rule set, in an environment limiting the functionality of the executed application; and where the application may be executed in the background of an operating system of the server based on the rule set.

Other embodiments include methods, systems, and devices where, for example a device embodiment may include (a) a processor and (b) addressable memory—where the addressable memory may for example be: flash memory, eprom, and/or a disk drive or other hard drive—comprising a set of one or more applications, wherein the processor may be configured to: (a) initiate a selected one or more applications of the set of one or more applications, wherein each initiated application may be associated with an Uniform Resource Locator (URL), and wherein the selection of the one or more applications may be based on a Hypertext Transfer Protocol (HTTP) request from a client; and (b) execute an application from the set of one or more applications, based on a rule set, in a processing environment limiting the functionality of the initiated application; and wherein the application may be executable in the background of an operating system of the device based on the rule set.

In some embodiments, the client may be external to the device. Optionally, the server may be disposed outside a network firewall. Optionally, the device may be a multifunction peripheral (MFP) device, and where the processor may host the client. The MFP device may also comprise a web application hosting platform.

Other embodiments include methods, systems, and devices where, for example a system embodiment may include: a server device, operably coupled to a client device via a communication medium, where the server device may be configured to execute a set of one or more applications, the device may comprise: (a) a memory that may be configured to store the set of one or more applications; (b) a processor that may be adapted to: (i) initiate a selected one or more applications of the set of one or more applications, wherein each initiated application may be associated with an Uniform Resource Locator (URL), and wherein the selection of the one or more applications may be based on a Hypertext Transfer Protocol (HTTP) request from a client; and (ii) execute an application from the set of one or more applications, based on a rule set, in an environment limiting the functionality of the initiated application; and wherein the application may be executable in the background of an operating system of the server based on the rule set.

BRIEF DESCRIPTION OF THE DRAWINGS

Embodiments are illustrated by way of example and not limitation in the figures of the accompanying drawings, and in which.

DETAILED DESCRIPTION

In a computer networked environment, a first computing device may host a virtual network computing server and a second computing device may host a virtual network computing client where the client may access and send commands to the server. A multifunction peripheral (MFP) device may be used to print and fax information from a computing device in communication, e.g., networked, with the MFP device. An MFP device may additionally be configured to scan sheets of documents and transmit the scanned sheets, in electronic form, to computing devices. In computing networks, the MFP device may be configured as a peripheral equipment having capabilities generally akin to a computing device with a processor and memory. In addition, the MFP device may execute one or more scripts at the MFP device. In some embodiments, an MFP device may act as the server and the client may be implemented as part of the MFP device.

Figure 1:
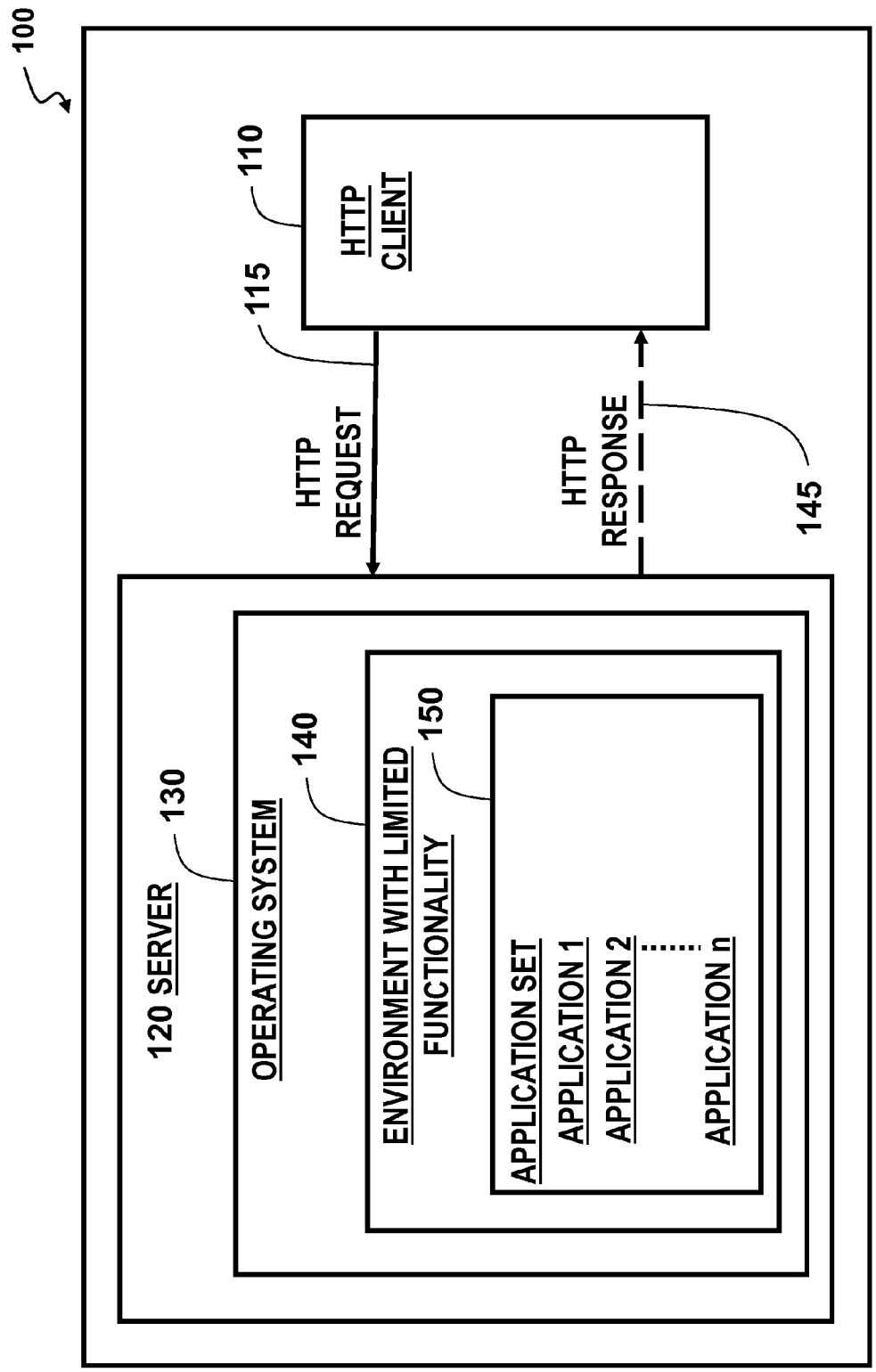
FIG. 1 depicts an exemplary embodiment of a system that includes a server and a hypertext transfer protocol (HTTP) client node.

FIG. 1 depicts an exemplary embodiment of a computing system 100 that includes a hypertext transfer protocol (HTTP) client node 110. In some embodiments, for example, an HTTP request 115 and an optional HTTP response 145 may be used to establish a connection between the client node 110 and operating system (OS) 130. In some embodiments, the server may execute a set of one or more applications via the OS 130 that may be running on the server node 120. The application set 150 may be limited in functionality, e.g., limited access to memory and to operating system services, according to a set of rules; rules which may be defined per application, per set of applications, or per server. The set of applications may be executed in an environment 140 adhering to the set of rules and limiting the scope and resources available to the application. Examples of such environments are: virtual environments or sandbox environments. The limited functionality may comprise the ability to execute a limited set of commands, for example: write, read, exit, and return. The application set may comprise a set of one or more applications each having a unique identification, e.g., Uniform Resource Locator (URL). The set of rules limiting the functionality of the applications may be determined prior to compilation or an application being dynamically loaded. In some embodiments, the HTTP client may direct the HTTP request 115—to initiate one or more of the applications—to a URL associated with each application in the application set 150. Optionally, the application may be executed by the OS 130 in the background of the server 120.

Figure 2:
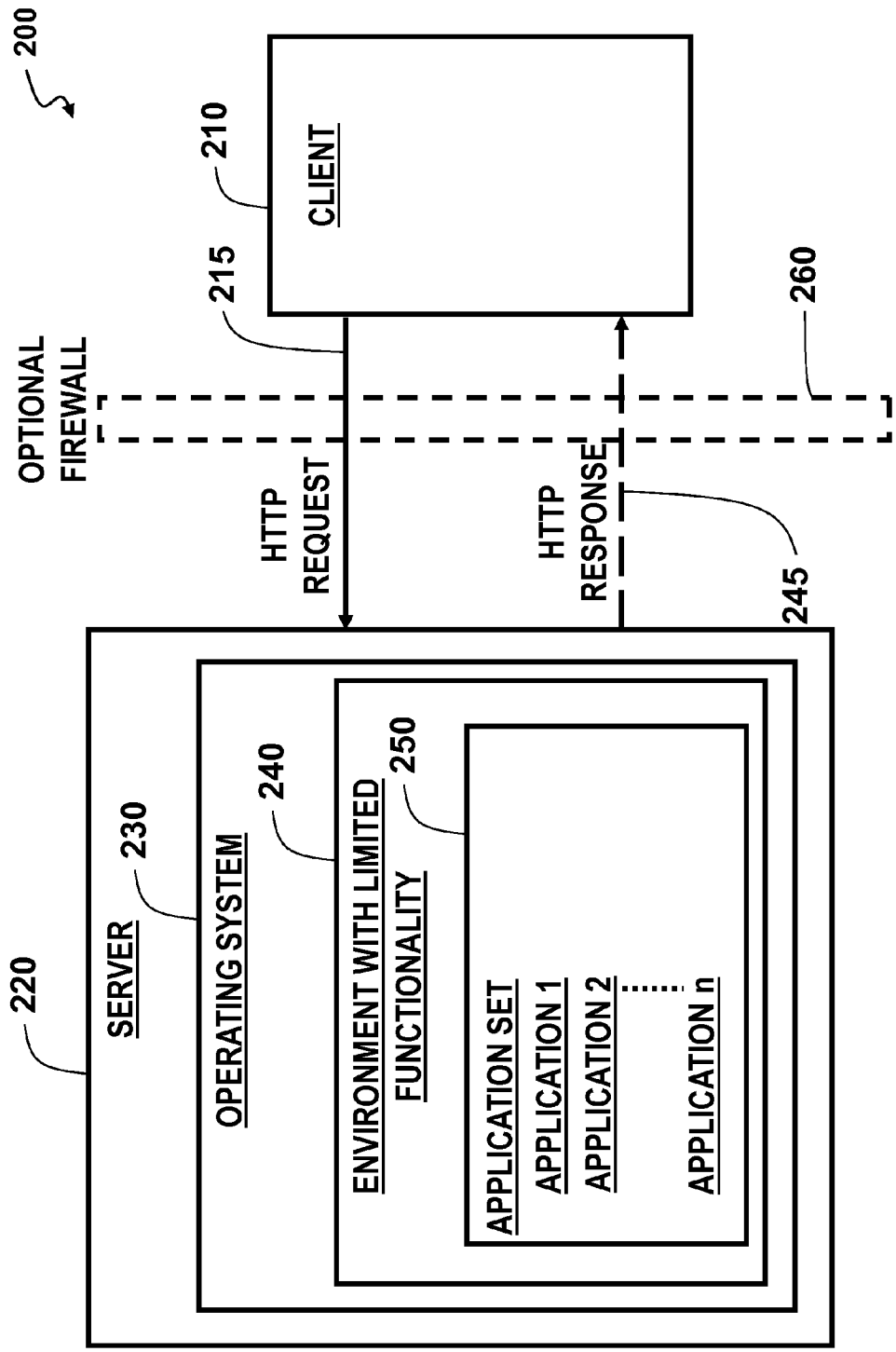
FIG. 2 depicts an exemplary embodiment of a client server system that includes a client node and a server node.

FIG. 2 depicts an exemplary embodiment of a client server system 200 that includes a client node 210 and a server node 220, where, at each node, computer instructions are present to support access to a first computing node via a second computing node, i.e., remote access. The exemplary client node 210 may comprise a user interface, a data store, a communication interface, and a CPU having an OS configured to host a remote access client. The exemplary server node 220 may comprise a communication interface, a CPU having an OS configured to host a server and a data store.

FIG. 2 further depicts in a top-level functional block diagram, an embodiment of a two-way communication established between a client 210 and a server 220, via an HTTP-encapsulation process. In some embodiments, for example, an HTTP request 215 and an optional HTTP response 245 may be used between the client 210 and the server 220 to establish the connection. In some embodiments, the server may execute a set of one or more applications via an OS 230 that may be running on the server 220. The application set 250 may be limited in functionality, e.g., limited access to memory and to operating system services, according to a set of rules which may be defined per application, per set of applications, or per server. The set of applications may be executed in an environment 240 adhering to the set of rules and limiting the scope and resources available to the application, e.g., a virtual environment or a sandbox environment. The application set may comprise a set of one or more applications each having a unique identification, e.g., a Uniform Resource Locator (URL). The set of rules limiting the functionality of the applications may be determined prior to compilation or prior to the application being dynamically loaded. In some embodiments, the server OS 230 may assign the URLs to each application, and the client may direct the HTTP request 215 to the URL that is associated with the application. Optionally, once an application has terminated, for example after successful completion or terminal failure—the application may return a response to the client. In some embodiments, the client may be external to the server and optionally, the client may be outside of a network firewall 260. In the exemplary embodiments where the client may be outside of a network firewall, an HTTP encapsulation method may be used to access the server.

Figure 3:
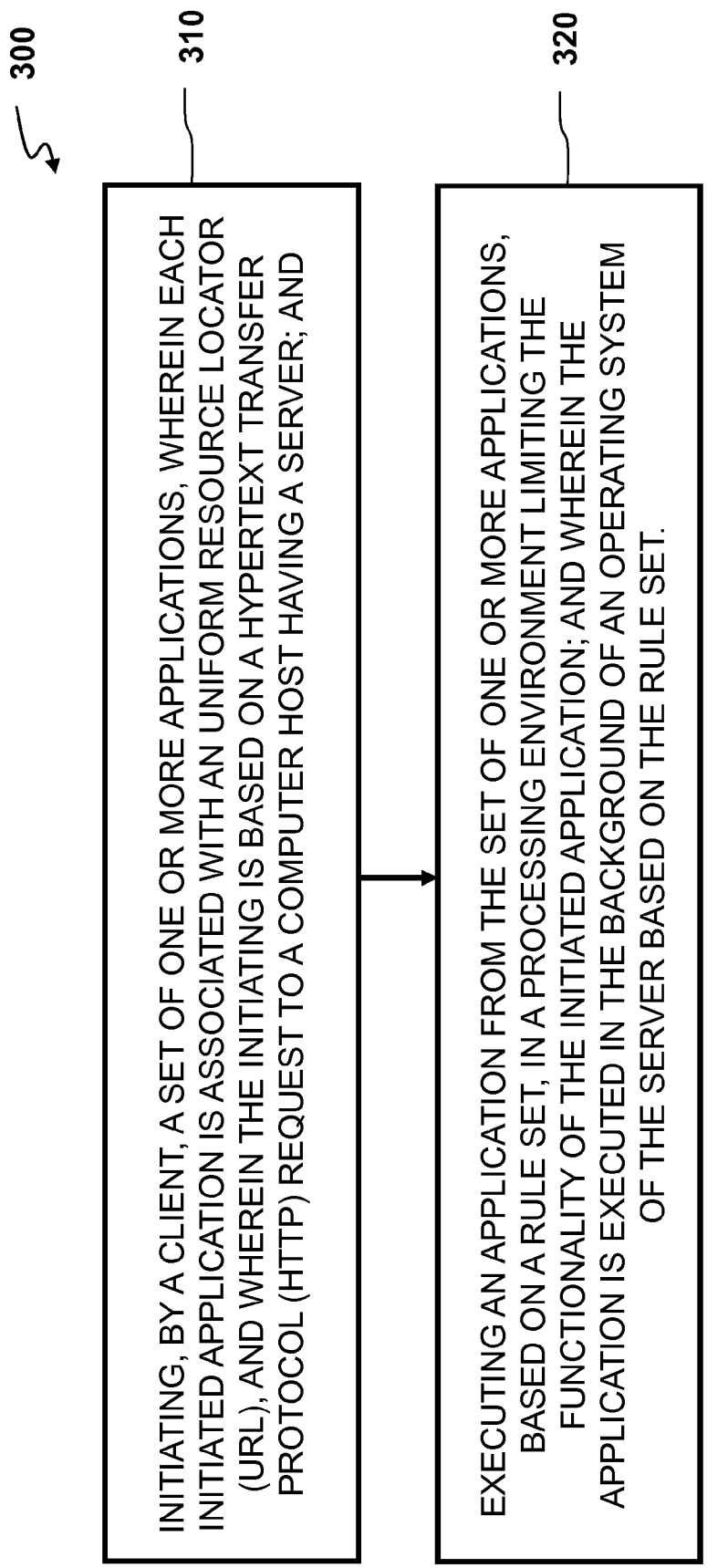
FIG. 3 is a flowchart of an exemplary process.

FIG. 3 is a flowchart of an exemplary sandboxed daemon process 300 in which the system comprises a computer and/or computing circuitry that may be configured to execute the steps as depicted. The method depicted in the flowchart includes the steps of: (a) initiating, by a client, a set of one or more applications, wherein each initiated application is associated with an Uniform Resource Locator (URL), and wherein the initiating is based on a Hypertext Transfer Protocol (HTTP) request to a server (step 310); and (b) executing an application from the set of one or more applications, based on a rule set, in an environment limiting the functionality of the initiated application; and wherein the application is executed in the background of an operating system of the server based on the rule set (step 320).

Figure 4:
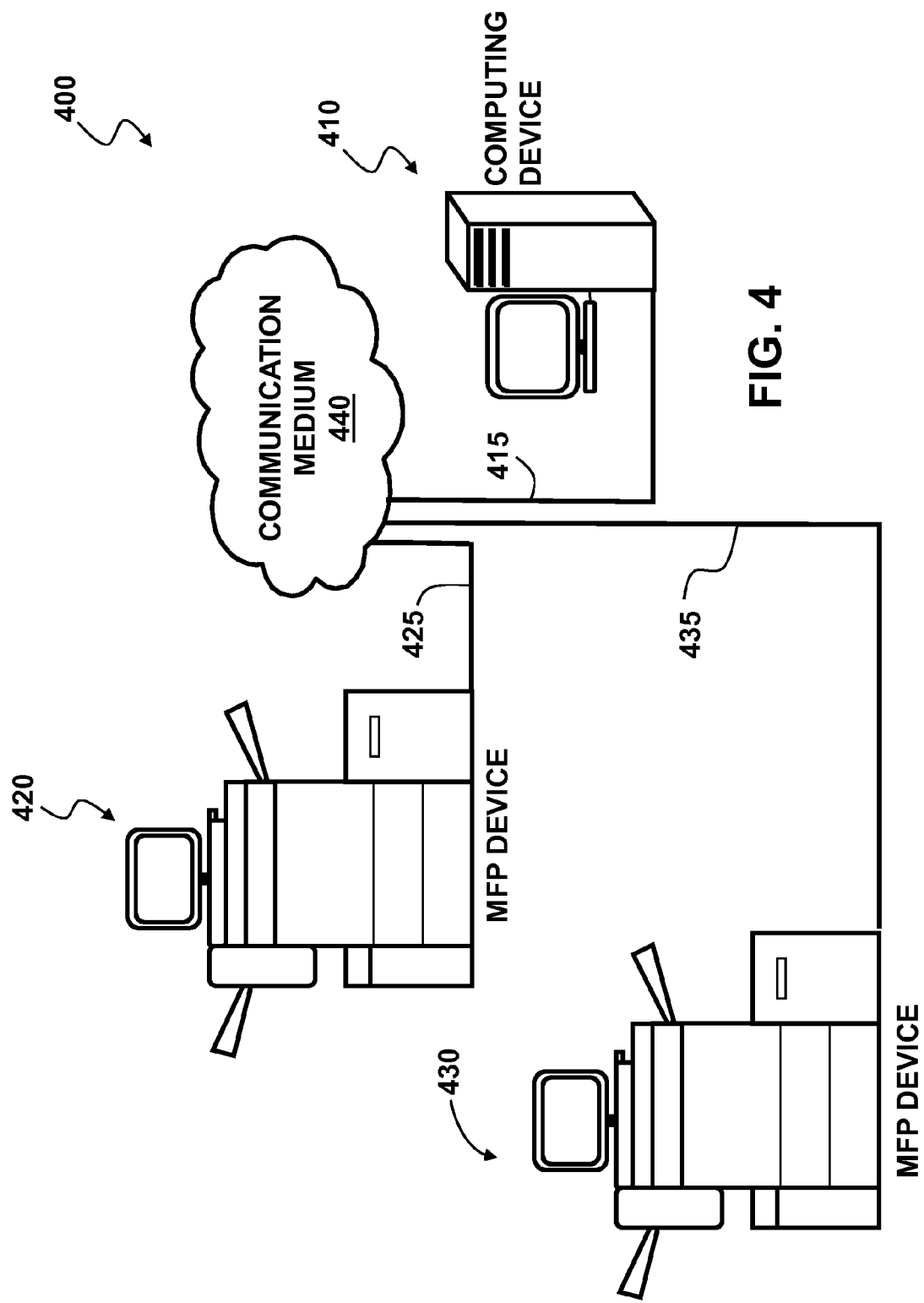
FIG. 4 illustrates an exemplary top level functional block diagram of an embodiment of a server computing device.

FIG. 4 illustrates an exemplary system embodiment 400 where a computing device 410 may be connected via a network link 415 to a set of MFP devices 420, 430. The MFP devices 420, 430, may each be linked to a communication medium 440 via network links 425, 435. Accordingly, the devices may be in operable communication via the communication medium 440, e.g., such as a local area network or the internet. The network links 415, 425, 435 may comprise multiple links, and may include wireless communication links, wired, and/or fiber optic communication links. The MFP devices 420, 430 may execute a set of one or more applications via the OS running on each device (see FIG. 2). The computing device 410 may communicate, via HTTP commands, with the MFP devices, and based on a set of URLs associated with applications on each MFP device, initiate a set of one or more applications—e.g., daemon applications—to be executed in the background of the OS of the MFP devices 420, 430.

In some embodiments, the MFP devices may comprise of a web application hosting/execution environment and a web browser client. The web browser client may serve as the user interface (UI) for embedded applications. The web application hosting environment may serve as the platform on which embedded applications execute. Applications may be invoked by the web browser via making HTTP requests to specific URLs. Each URL may correspond to a specific web application that is deployed on the MFP. The embedded applications may, for example, be developed using a server-side scripting language. The server-side scripts may be executed on the web application hosting platform in an environment limiting the functionality of the application, e.g., sandboxed environment.

Each MFP device may comprise an embedded web application server that may allow executable applications or scripts, e.g., Embedded Java Script (EJS), to be executed on the MFP device. Applications may be developed using EJS and may be installed and executed directly, on the MFP devices 420, 430.

Figure 5:
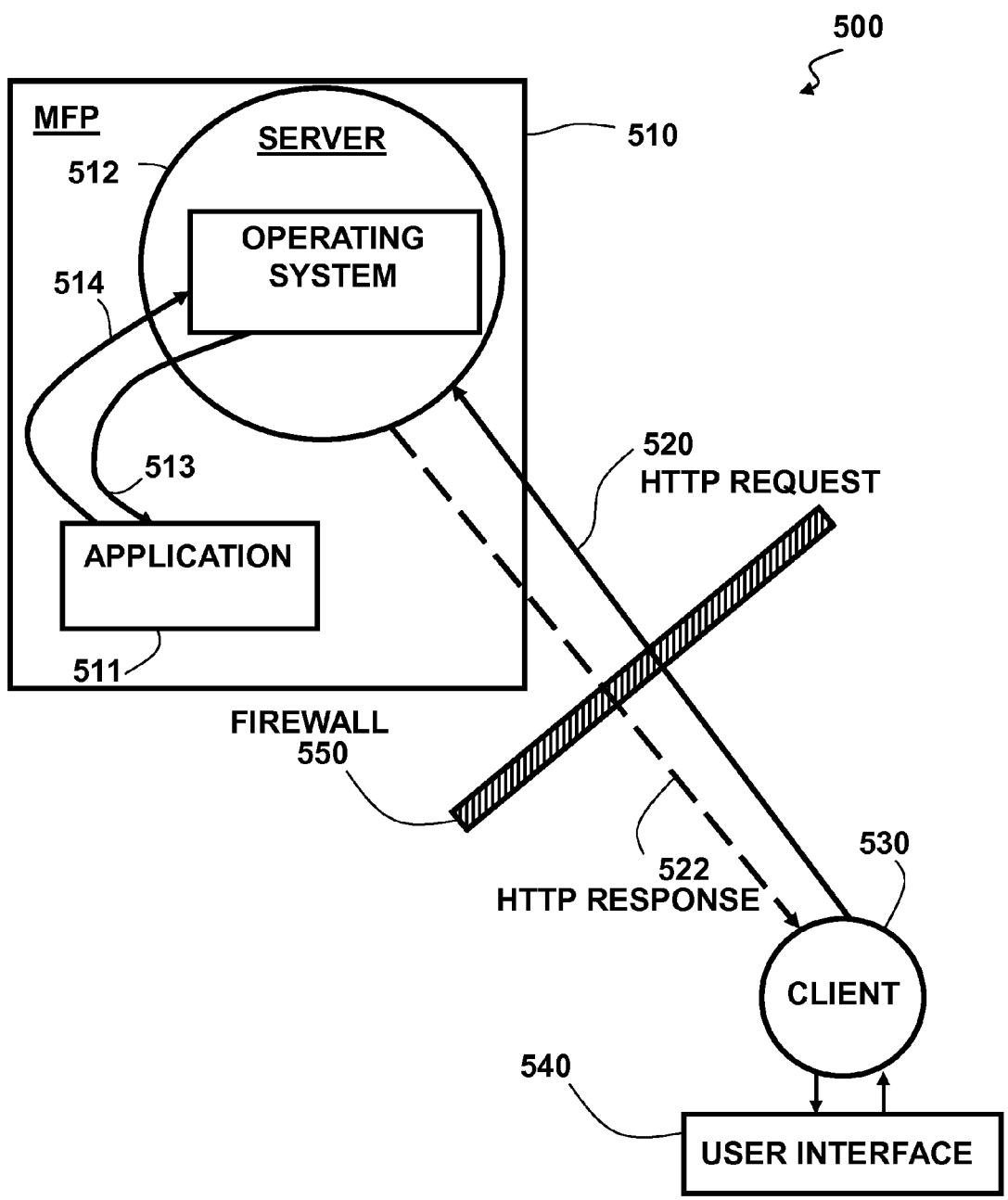
FIG. 5 depicts an exemplary embodiment of an MFP device.

FIG. 5 depicts an exemplary embodiment of a local server node 500, e.g., an MFP device 510, comprising a server 512 configured to execute a set of applications. The client 530 and server 512 may communicate with each other via various means, including, for example, via wired or wireless network segments, where various protocols and markup languages may be used, such as transmission control protocol (TCP) over Internet Protocol (IP)—TCP/IP, hypertext transfer protocol (HTTP) with hypertext markup language (HTML), simple object access protocol (SOAP) with extensible markup language (XML), and other communication means adapted to operably connect the client 530 to the server 512 and with any other devices within the system 500. The client 530 may comprise a user interface 540 thereby allowing a user to initiate communications with the server 512. The client 530 may communicate with the server 512 component via a socket connection and send data, e.g., HTTP connection requests 520, to the server 512. The client may connect to the server via an HTTP-encapsulation method. The client 530 component may reside on a trusted external network host whereby the client 530 communicates with the server where the server may reside on a protected network resource. Additionally, the client 530 may be deployed within a network environment where the server 512 is ostensibly protected by an optional network firewall 550. In some embodiments, the client may initiate the execution of an application 511, where the application may be limited in functionality according to a set of rules. In some embodiments, the client may direct the HTTP request 520 to a uniquely assigned URL associated with each of the applications. An optional HTTP response 522 may not be received by the client upon the initiation of powering down sequence of the MFP, or if the application is explicitly uninstalled, during the uninstallation sequence.

In some embodiments, background processes, e.g., a daemon process, may be used in a number of operating systems, for example, the UNIX operating system makes extensive use of daemon processes. The Windows operating system also makes use of background processes, e.g., system services. Daemon processes may run in the background and process incoming print requests, for example, in Linux operating systems the line printing daemon may operate through the lpr protocol. Some examples of tasks that may be performed by a daemon process are: parsing and processing of lpr commands, queuing of print data, and dispatching print data to the correct printers. In some embodiments, the daemon may run perpetually in the background until either the system shuts down or the daemon is explicitly terminated. Daemon processes may not interact with the user directly and hence, may have no user interface elements.

In some embodiments, a sandboxed daemon process hosted on a web application platform may be implemented in an embedded system and additionally, may be invoked through standard HTTP requests. On a web-based application platform, a sandboxed daemon process may be used to provide, for example, monitoring services. The daemon processes may be implemented in server-side scripts which may be executed via a scripting engine in the embedded system. In some embodiments daemon processes may be developed and deployed on-demand without having to update the device firmware. Newly-developed daemon processes may be deployed without linking precompiled binaries into the target image and reprogramming the device firmware. On an operating system with a flat memory model, daemon processes may call system APIs or write to critical memory regions and crash the system. With a web-based application hosting environment, daemon processes may run inside a sandbox, where they may only access methods that are explicitly exposed to them. The sandbox environment may make the target embedded system much more secure and robust. The sandbox environment provided by the web application hosting platform may protect the target system from being compromised by rogue or misbehaved daemons.

In some embodiments, the applications may interact with the user through standard input controls on web pages, e.g., standard web applications, and may perform specific functions and return results through standard web pages. In other embodiments, the applications, e.g., UNIX daemons, may execute in the background and not necessarily return results immediately or at all.

The applications that execute in the background may execute asynchronously, and may perform one or more functions that require long durations, and may terminate when all the tasks have been completed. As an example, a daemon application may be developed to allow the MFP devices, which may reside within a networked environment, to be monitored and managed from outside of a firewall. In this example, the application may run in the background and periodically communicate with a designated external computing device.

In an embodiment where an HTTP request may invoke a background process, a remote cloud application may start a daemon process, e.g., to monitor a print or scan operation. The daemon process may have to live for a period sufficient to monitor the job to either successful completion or terminal failure. In another example, a cloud application may start a daemon process to monitor application installations. The daemon process may have to live until the application is either successfully installed or the installation is aborted due to an irrecoverable error. In another example, a click-count-collecting embedded application may start a daemon process. After the application is installed, the application may need to be triggered to start running in the background. This may be done by sending an HTTP request message to the URL corresponding to the particular application. The click-count-collecting daemon may then run until the MFP is powered down, or until the application is explicitly uninstalled or terminated.

In some embodiments, a web application hosting environment may require explicit HTTP requests to the server to initiate execution of server-side scripts within the sandboxed environment. A server-side script may take input parameters through HTTP query strings or from POST parameters. For long-lived daemon processes that may need to be started on system power-up, a generic TCP client may be used to initiate the process. For ephemeral daemon processes, the application may be started on-demand by making HTTP requests to the associated URLs when needed. For a web-based application platform, the executable components may be initiated by making an HTTP request to an associated URL. This HTTP invocation may be analogous to a shell command processor, where applications are invoked through command lines. Application arguments may be passed in through query strings or POST elements, similar to command line arguments.

The application may be continuously running in the background in order for the commands to be received and processed. In another example, the application may perform device discovery where a starting IP address and an ending IP address may be provided by a client. The application may then scan through the range of specified IP addresses to search for the presence of MFP devices in the network. The discovery application may run in the background until the entire range of IP addresses has been exhausted, or optionally, until the search is explicitly canceled.

Figure 6:
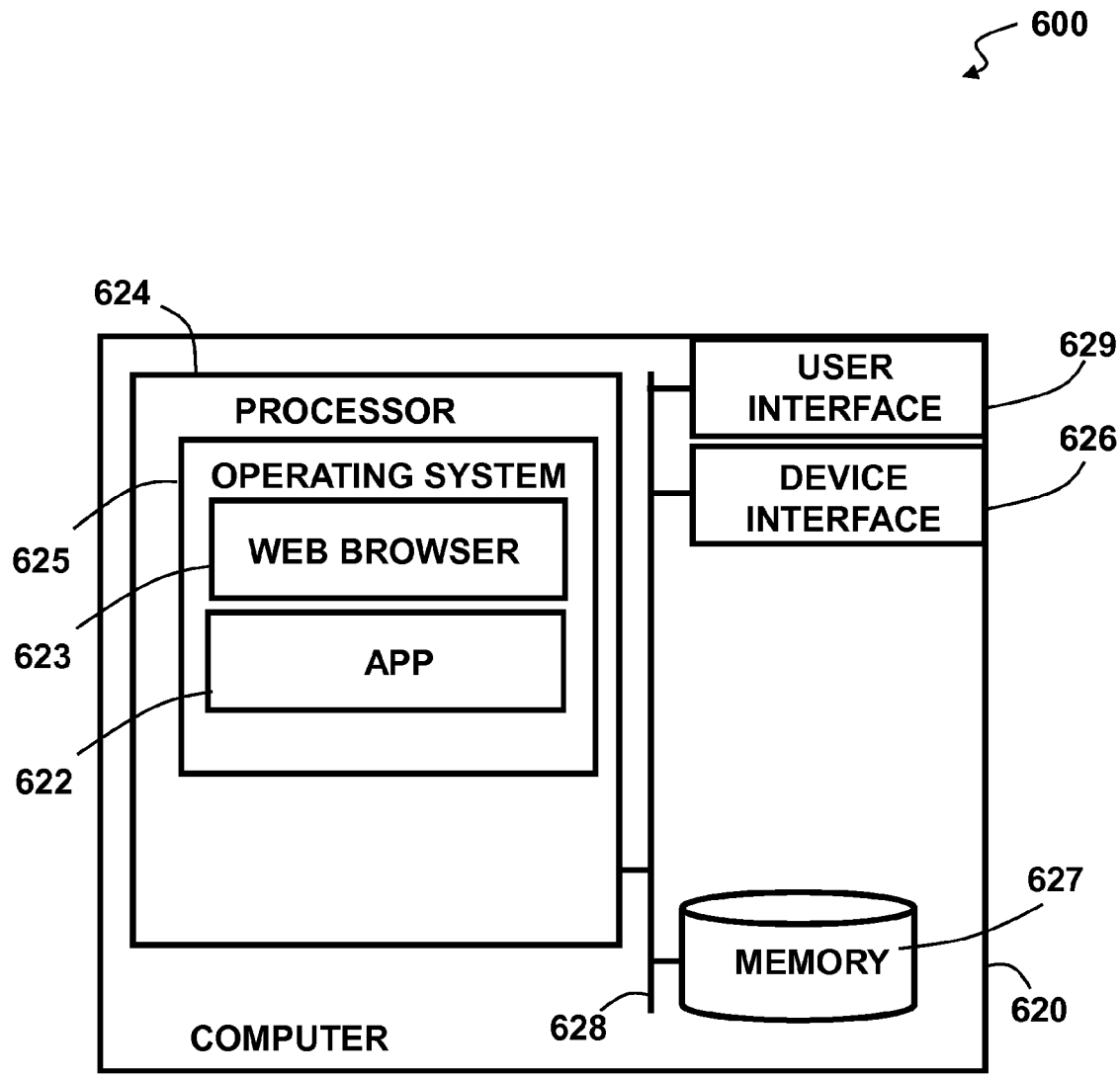
FIG. 6 illustrates an exemplary top level functional block diagram of a computing device comprising a server.

FIG. 6 illustrates an exemplary top level functional block diagram of a server computing device embodiment 600. The exemplary operating environment is shown as a computing device 620 comprising a processor 624, such as a central processing unit (CPU), addressable memory 627, an external device interface 626, e.g., an optional universal serial bus port and related processing, and/or an Ethernet port and related processing, and an optional user interface 629, e.g., an array of status lights and one or more toggle switches, and/or a display, and/or a keyboard and/or a pointer-mouse system and/or a touch screen. Optionally, the addressable memory may for example be: flash memory, eprom, and/or a disk drive or other hard drive. These elements may be in communication with one another via a data bus 628. Via an operating system 625 such as one supporting a web browser 623 and applications 622, the processor 624 may be configured to execute steps of a sandboxed daemon process according to the exemplary embodiments described above.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples and should not be limited by the particular disclosed embodiments described above.

What is claimed is:

1. A method comprising:
    initiating, by a client, a set of one or more applications, wherein the initiating is based on a Hypertext Transfer Protocol (HTTP) request to a computer host having a server;
    assigning, by the server, a Uniform Resource Locator (URL) to each initiated application thereby associating each initiated application with the URL;
    determining, by the server, a rule set based on the association of the initiated application and the URL, wherein the rule set is defined as at least one of: per application, per set of applications, and per server; and
    executing an application from the set of one or more applications, based on the rule set, in a processing environment limiting the functionality of the initiated application; and wherein the application is executed in the background of an operating system of the server based on the rule set and without returning a response to the client.

2. The method of claim 1 wherein the client is external to the server.

3. The method of claim 1 wherein the client is disposed outside a network firewall.

4. The method of claim 1 wherein the server is a multifunction peripheral (MFP) device.

5. The method of claim 4 wherein the client is a multifunction peripheral (MFP) device.

6. The method of claim 4 wherein the MFP device comprises a web application hosting platform.

7. A method comprising:
    invoking, by a server of a computer host, via a Hypertext Transfer Protocol (HTTP) request from a client, a set of one or more applications, each invoked application associated with an Uniform Resource Locator (URL);
    assigning, by the server, the URL to each initiated application of the set of one or more applications thereby associating each initiated application with the URL;
    determining, by the server, a rule set based on the association of the initiated application and the URL, wherein the rule set is defined as at least one of: per application, per set of applications, and per server; and
    executing, by the server, an application from the set of one or more applications, based on the rule set, in an environment limiting the functionality of the executed application; wherein the application is executed in the background of an operating system of the server based on the rule set and without returning a response to the client.

8. A device comprising:
    a processor and addressable memory comprising a set of one or more applications, wherein the processor is configured to:
        initiate a selected one or more applications of the set of one or more applications, wherein the selection of the one or more applications is based on a Hypertext Transfer Protocol (HTTP) request from a client;
        assign, by a server, a Uniform Resource Locator (URL) to each selected application thereby associating each selected application with the URL;
        determine, by the server, a rule set based on the association of the initiated application and the URL, wherein the rule set is defined as at least one of: per application, per set of applications, and per server; and
        execute an application from the set of one or more applications, based on the rule set, in a processing environment limiting the functionality of the initiated application; and wherein the application is executable in the background of an operating system of the device based on the rule set and without returning a response to the client.

9. The device of claim 8 wherein the client is external to the device.

10. The device of claim 8 wherein the client is disposed outside a network firewall.

11. The device of claim 8 wherein the device is a multifunction peripheral (MFP) device.

12. The device of claim 11 wherein the device is a multifunction peripheral (MFP) device, and wherein the processor hosts the client.

13. The device of claim 11 wherein the MFP device comprises a web application hosting platform.

14. A system comprising:
    a server device, operably coupled to a client device via a communication medium, the server device configured to execute a set of one or more applications, the device comprising:
        a memory configured to store the set of one or more applications;
        a processor configured to:
            initiate a selected one or more applications of the set of one or more applications, wherein the selection of the one or more applications is based on a Hypertext Transfer Protocol (HTTP) request from a client; and
            assign a Uniform Resource Locator (URL) to each selected application thereby associating each selected application with the URL;
            determine a rule set based on the association of the selected application and the URL, wherein the rule set is defined as at least one of: per application, per set of applications, and per server; and
            execute an application from the set of one or more applications, based on a rule set, in an environment limiting the functionality of the initiated application; and wherein the application is executable in the background of an operating system of the server based on the rule set and without returning a response to the client.

15. A method comprising:
    initiating, by a first multifunction peripheral (MFP) device, a set of one or more applications, wherein the initiating is based on a Hypertext Transfer Protocol (HTTP) request to a second MFP;
    executing an application from a set of one or more applications, based on a rule set, in a processing environment limiting the functionality of the initiated application; wherein the application is executed in the background of an operating system of the server based on the rule set; and wherein executing the application is to invoke a long-lived application, selected from the set of one or more applications, wherein the executed application performs monitoring of a set of print functions and a set of scan functions on the MFP devices.

16. A method comprising:
    initiating, by a client, a set of one or more applications, wherein the initiating is based on a Hypertext Transfer Protocol (HTTP) request to a computer host having a server;

assigning, by the server, a Uniform Resource Locator (URL) to each initiated application thereby associating each initiated application with the URL;

determining, by the server, a rule set based on the association of the initiated application and the URL, wherein the rule set is defined as at least one of: per application, per set of applications, and per server; and executing an application from the set of one or more applications, based on the rule set, in a processing environment limiting the functionality of the initiated application; wherein the application is executed in the background of an operating system of the server based on the rule set wherein the executed application is a daemon process running on the server, and wherein the daemon process is triggered by the client in a passive manner.

* * * * *

UNITED STATES PATENT AND TRADEMARK OFFICE
CERTIFICATE OF CORRECTION

PATENT NO.        : 8,825,748 B2
APPLICATION NO.   : 13/176927
DATED             : September 2, 2014
INVENTOR(S)       : Swee Huat Sng and Joseph Yang It is certified that error appears in the above-identified patent and that said Letters Patent is hereby corrected as shown below:

In the Specification

Column 1, line 16 please change "where, for example a method embodiment may include the"
to --where, for example, a method embodiment may include the--

Column 1, line 34 please change "where, for example a method embodiment may include the"
to --where, for example, a method embodiment may include the--

Column 1, line 46 please change "where, for example a device embodiment may include (a) a"
to --where, for example, a device embodiment may include (a) a--

Column 1, line 48 please change "able memory may for example be: flash memory, eprom,"
to --able memory may, for example, be: flash memory, eprom,--

Column 1, line 65 please change "tion peripheral (MFP) device, and where the processor may"
to --tion peripheral (MFP) device, where the processor may--

Column 2, line 2 please change "where, for example a system embodiment may include: a"
to --where, for example, a system embodiment may include: a--

Column 3, line 51 please change "Optionally, once an application has terminated, for example"
to --Optionally, once an application has terminated, for example,--

Column 4, line 24 please change "In some embodiments, the MFP devices may comprise of a"
to --In some embodiments, the MFP devices may be comprised of a--

Column 4, line 45 please change "configured to execute a set of applications. The client 530 and"
to --configured to execute 513, 514 a set of applications 511. The client 530 and--

Signed and Sealed this
Third Day of February, 2015

Michelle K. Lee
*Deputy Director of the United States Patent and Trademark Office*

CERTIFICATE OF CORRECTION (continued)
U.S. Pat. No. 8,825,748 B2

Column 6, line 36 please change "device discovery where a starting IP address and an ending IP" to --device discovery with a starting IP address and an ending IP--

Column 6, line 54 please change "may for example be: flash memory, eprom, and/or a disk drive" to --may, for example, be: flash memory, eprom, and/or a disk drive--